3,031,923
PROJECTION DEVICE FOR READING AND SETTING LENGTH AND ANGULAR DIMENSIONS
Johannes Heidenhain, Egerer, near Chieming, Germany, assignor to Fa. Wenczler & Heidenhain, Traunreut, near Traunsten, Upper Bavaria, Germany, a corporation of Germany
Filed Apr. 20, 1959, Ser. No. 807,373
3 Claims. (Cl. 88—24)

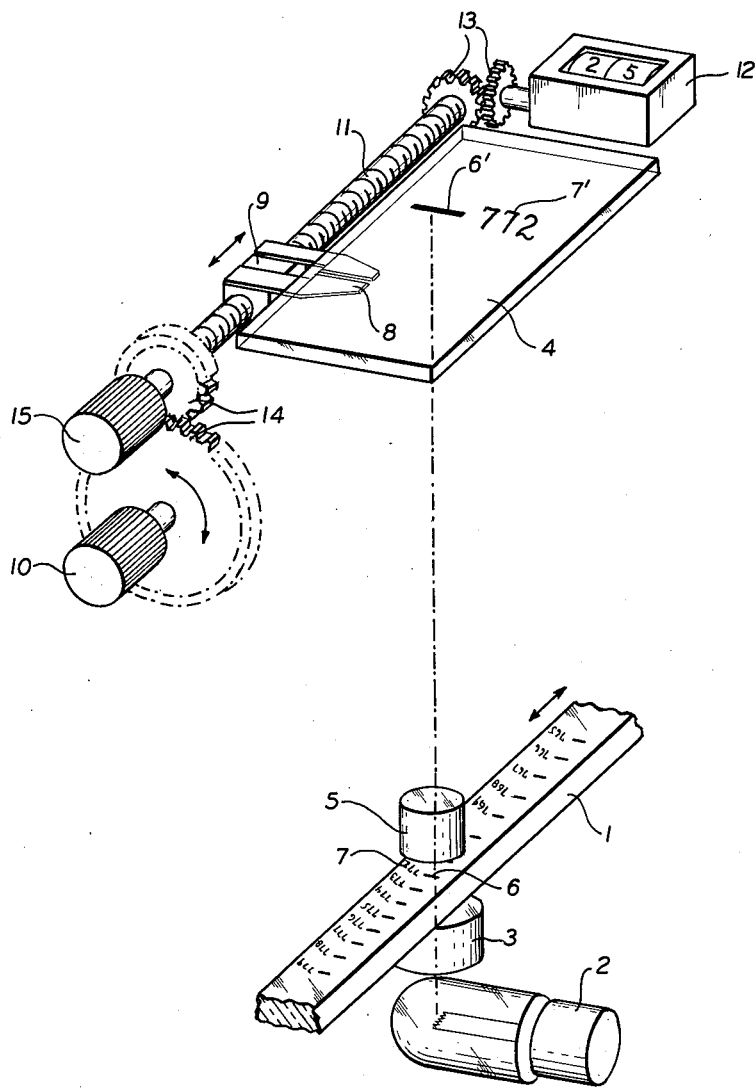

The present invention relates to a projection device for reading and setting of length- and angular-measuring divisions.

Devices are known already for the reading of the position of length- and angular-measuring divisions, wherein the fine reading of intervals is possible by means of transverse measuring rods or by means of two-dimensional transverse measuring plates. Devices are also known wherein a direct numerical indication of the set and reading value, respectively, on a projection screen is achieved, by means of an additional ray line and by means of a fine scale sensed by said ray line, which fine scale is brought by the operator into a defined position to the projection image of the sensed scale line.

The great advantage of a direct numerical indication of the measuring and reading value, respectively, can be achieved by the arrangement, in accordance with the present invention, if a limitation to two digits during the fine reading of the intervals of the used measuring division is made, at the same time avoiding a complicated second ray line and the co-ordinated fine scale.

It is, therefore, one object of the present invention to provide a projection device for reading and setting of length- and angular measuring divisions, which comprises mechanical counting means for the indication of portions of the intervals of the used measuring division, if necessary in connection with suitable drives.

With this and other objects in view, which will become apparent in the following detailed description, the present invention will be clearly understood in connection with the accompanying drawing, in which the only FIGURE is a schematic perspective view of the projection device designed in accordance with the present invention.

Referring now to the drawing, and in particular to the only FIGURE shown, the measuring rod 1, which is subjected to the light rays from the lamp 2 by means of the condenser 3, is projected onto the projection screen 4, and in particular a section thereof, by means of the objective 5, the length of the projection screen 4 corresponding with the image of the length of an interval of the measuring division, so that always an image 6' of the scale line 6 of the measuring division and the image 7' of the co-ordinated scale line number 7 appear on the projection screen 4.

In order to locate the image 6' of the scale line 6, a locating fork 8 is provided which is secured to a nut 9. By operation of a turning head 10, the nut 9 and, thereby, also the locating fork 8, may be displaced by means of the screw or threaded spindle 11 in the direction of the image of the division of the measuring rod 1. A counting device 12 is driven by the spindle 11, preferably over a beveled gear drive 13. A counting device 12 operating as an adding or subtracting unit is used, depending upon the direction of rotation of the spindle 11.

In the embodiment shown in the drawing, an additional intermediate drive 14 is provided between the turning head 10 and counting device 12. By means of said intermediate drive 14, one revolution of the turning head 10 may be transformed into a plurality of revolutions of the spindle 11, which operates the counting device 12 and displaces the locating fork 8. In the embodiment shown in the drawing, an additional turning head 15 is provided on the drive 14, which additional turning head 15 permits a fine adjustment of the locating fork 8.

If, for instance, an arrangement is made, so that upon performing 100 revolutions on the counting device, the locating fork 8 moves for a length equivalent to the length of the interval of the image of the scale division the counting device indicates, upon locating the image 6' of the scale line 6 of the measuring division, the interval part portions by two digit positions, provided the counting device is adjusted in such a manner, that it shows at the lower interval limit between the images of two adjacent scale lines the number 0. By such arrangement, it is thus possible to read and to set, respectively, a millimeter division in steps of 0.01 mm. It is possible, however, to provide a fine division of the interval of the measuring scale also in a different manner.

If, for instance, a circular division is present as a measuring division, the interval of which amounts to 10 minutes, an arrangement can be made, for instance, according to which the locating fork 8 moves at 120 revolutions of the counting device 12 for a distance equivalent with the length of the interval of the image of the circular division. If the numbers of the counting device 12 are arranged correspondingly, that the numerical values indicated thereby may be raised or lowered by 5 units from revolution to revolution, the counting device 12 indicates the interval part portions of the 10 minute division in steps of 5 seconds.

By the above-described measuring device, the reading or set value is given directly in form of a number.

While I have disclosed one embodiment of the present invention, it is to be understood that this embodiment is given by example only and not in a limiting sense, the scope of the present invention being determined by the objects and the claims.

I claim:

1. A projection device for reading and setting length- and angular-dimensions comprising a measuring scale member carrying a plurality of scale lines to constitute a main scale, a projection screen, and a light source disposed adjacent said measuring scale member and lens means projecting enlarged images of said scale lines of said measuring scale member onto said projection screen, a single locating fork movable along said projection screen for a length corresponding with the entire image of one interval of said main scale, a single counting device having means for indicating additions and subtractions, respectively, thereof, and means for transmitting the length of movement of said locating fork along said projection screen to said single counting device to indicate in numbers any change of position of said locating fork.

2. A projection device for reading and setting length- and angular-dimensions comprising a measuring scale member carrying scale lines, a projection screen, and a light source disposed adjacent said measuring scale member and lens means projecting enlarged images of said scale lines of said measuring scale member onto said projection screen, a locating fork disposed in a plane spaced apart from and parallel to said projection screen, means for moving said locating fork relative to said projection screen transversely to said images of said scale lines on said projection screen, a counting device having means for indicating additions and subtractions, respectively, thereon, in numbers, and means for transmitting the length of movement of said locating fork to said counting device to indicate in numbers any change of position of said locating fork, said means for moving said locating fork comprising a threaded spindle disposed along said projection screen and means for turning said spindle, a nut moving axially along said spindle upon turning the latter, said locating fork being secured to said nut, and gear means disposed at one end of said spindle and operatively connected with said counting device to perform additions and subtractions, respectively, said spindle and said gear means constituting said means for transmitting the length of movement of said locating fork to said counting device.

3. The projection device, as set forth in claim 2, which includes an intermediate drive disposed between said spindle turning means and said counting device.

References Cited in the file of this patent

UNITED STATES PATENTS

| | | |
|---|---|---|
| 2,311,142 | Turrettini | Feb. 16, 1943 |
| 2,422,611 | Becker et al. | June 17, 1947 |
| 2,592,264 | Fultz | Apr. 8, 1952 |
| 2,941,446 | Senglet | June 21, 1960 |

FOREIGN PATENTS

| | | |
|---|---|---|
| 580,698 | France | Sept. 6, 1924 |
| 156,164 | Switzerland | Oct. 1, 1932 |
| 600,847 | Great Britain | Apr. 20, 1948 |

OTHER REFERENCES

Mechanix Illustrated, periodical publication, March 1943, page 134 cited.